(12) United States Patent
Chandler, Jr. et al.

(10) Patent No.: US 7,746,237 B1
(45) Date of Patent: Jun. 29, 2010

(54) WASTEWATER FLUID LEVEL SENSING AND CONTROL SYSTEM

(75) Inventors: William D. Chandler, Jr., Ashland, OH (US); Aaron R. Wolfe, Ashland, OH (US)

(73) Assignee: Chandler Systems, Inc., Ashland, OH (US)

( * ) Notice: Subject to any disclaimer, the term of this patent is extended or adjusted under 35 U.S.C. 154(b) by 4 days.

(21) Appl. No.: 12/340,703

(22) Filed: Dec. 20, 2008

Related U.S. Application Data

(62) Division of application No. 11/610,968, filed on Dec. 14, 2006, now Pat. No. 7,471,207, which is a division of application No. 11/279,094, filed on Apr. 7, 2006, now Pat. No. 7,151,459, which is a division of application No. 10/711,602, filed on Sep. 28, 2004, now Pat. No. 7,075,443.

(60) Provisional application No. 60/507,249, filed on Sep. 29, 2003.

(51) Int. Cl.
    *G08B 21/00* (2006.01)
(52) U.S. Cl. .......................... 340/618; 340/525; 341/33
(58) Field of Classification Search ................ 340/618, 340/612, 620, 525, 562; 341/20, 21, 33; 700/17
    See application file for complete search history.

(56) References Cited

U.S. PATENT DOCUMENTS

| | | | |
|---|---|---|---|
| 4,084,547 A | 4/1978 | Deziel | |
| 4,237,421 A | 12/1980 | Waldron | |
| 5,153,572 A | 10/1992 | Caldwell et al. | |
| 5,661,462 A | 8/1997 | Shrewsbury-Gee | |
| 5,973,608 A | 10/1999 | McMahon | |
| 6,005,483 A | 12/1999 | West | |
| 6,443,005 B1 | 9/2002 | Chandler, Jr. | |
| 6,595,051 B1 | 7/2003 | Chandler, Jr. | |
| 6,970,079 B2 | 11/2005 | Sabatino | |
| 7,075,443 B1 | 7/2006 | Chandler et al. | |
| 7,151,459 B1 | 12/2006 | Chandler et al. | |
| 7,471,207 B1 * | 12/2008 | Chandler et al. ............ | 340/618 |

* cited by examiner

*Primary Examiner*—John A Tweel, Jr.
(74) *Attorney, Agent, or Firm*—Christopher L. Parmelee; Walker & Jocke

(57) ABSTRACT

A wastewater fluid level sensing and control system is provided. The system comprises a control panel, a reservoir, at least one pump and a fluid level sensing device. The control panel comprises a housing and user interface input and output devices for use with configuring the operation of the control panel. The control panel may be configured to turn on one or more of the pumps to lower the level of fluid in the reservoir. When the level is above a selectable level, the control panel is operative to cause at least one alarm signal to be output.

14 Claims, 14 Drawing Sheets

WASTEWATER FLUID LEVEL SENSING AND CONTROL SYSTEM

CROSS REFERENCE TO RELATED APPLICATIONS

This application is a divisional of U.S. application Ser. No. 11/610,968 filed Dec. 14, 2006 (now U.S. Pat. No. 7,471,207), which is a divisional of U.S. application Ser. No. 11/279,094 filed Apr. 7, 2006 (now U.S. Pat. No. 7,151,459), which is a divisional of U.S. application Ser. No. 10/711,602 filed Sep. 28, 2004 (now U.S. Pat. No. 7,075,443), which claims benefit of U.S. provisional application Ser. No. 60/507,249 filed Sep. 29, 2003, all of which applications are hereby incorporated herein by reference.

TECHNICAL FIELD

The present invention relates to wastewater systems. Specifically this invention relates to fluid level sensing and control systems and methods for wastewater systems.

BACKGROUND ART

It is often desirable to know information about fluid levels in reservoirs. Determining fluid levels and controlling fluid levels in reservoirs, such as in sewage tanks, wells, water cisterns or tanks, and other fluid system and storage vessels, whether enclosed or open and exposed to the environment, has been done in a number of ways. For example, in tanks that are visually accessible, an operator may periodically take visual readings of the fluid level.

Visual readings, however, are often not desirable in systems where an automatic response is required when the fluid level reaches a certain threshold. In such cases the activation of a pump or valve may be necessary to move more fluid into the tanks or to discharge fluid from the tank. In systems where visual readings are not available or when an immediate response is required, control systems are typically employed that are responsive to a fluid level indication. Such control systems may illuminate a light on an indicator panel representing the fluid level and/or trip an audible alarm to notify a human operator that corrective action is required.

Examples of fluid level sensing devices for use with wastewater reservoirs or other fluid holding vessels are discussed in U.S. Pat. No. 6,595,051 of Jul. 22, 2003 and U.S. Pat. No. 6,443,005 of Sep. 3, 2002 which are both incorporated by reference herein.

Different types or configurations of tanks often require different types or configurations for control systems associated with the tank. For example, some tanks may have one pump while other tanks have more than one pump which are capable of moving fluids out of the tank. In addition, some tanks may include fluid level sensing devices in the form of mechanical floats positioned at various levels in the tank, while other tanks may use fluid level sensing devices such as a pressure bell located at the bottom of the tank such as shown in U.S. Pat. No. 6,595,051.

Although control systems have been produced for each of these systems, such systems are generally limited to working with only a specific type of wastewater tank configuration. If the requirements for the tank change over time, a completely new system which can accommodate the new requirements for the tank must be installed. Thus there exists a need for a control system which is more easily adaptable to changing requirements for a wastewater system.

Wastewater control systems are often designed to cause one or more pumps to start pumping fluid out of a tank responsive to the level of fluid in the tank. It is often desirable to use pumps with single phase motors for this purpose. Because single phase motors do not have multiple phases, to begin rotation, start windings are required to achieve motor acceleration. Historically, this has been achieved with the use of a potential relay that measures the voltage during the start. In response to the voltage measurement, a relay can be configured to drop out the start winding. Because start capacitors operate in parallel with the start winding, the relay must open at the correct time so that the voltage does not build too high and blow up the start capacitor. Thus, to increase the reliability of such control systems, there exists a need for a control system which can reliably prevent start capacitors from being damaged.

Embodiments of control systems for monitoring and controlling wastewater systems may include a momentary contact push button accessible from the outside of the control system housing. Such a push button may be capable of temporarily silencing an alarm produced by the control system until the wastewater system is again working properly. For example, the control system may include a circuit board within the housing of the control system which is operative to monitor and control conditions associated with a wastewater system. The circuit may include a latching relay which is coupled to the push button. The latch relay may be responsive to the momentary contact push button being pressed to open (i.e., deactivate) the portion of the circuit which produces the alarm.

The momentary contact push button may be positioned on the control system to be accessible by an operator without opening the housing. However, control system housings are often designed to comply with one or more standards for water resistance such as the National Electrical Manufacturers Association (NEMA) standards. An example of such a standard may included a NEMA 4X standard for a housing which specifies that the housing is capable of resisting certain levels of water and corrosive materials. In a wastewater environment, the control panel may be relatively close to the fluids that are being monitored and controlled by the control panel. In addition, in a wastewater environment, the housing for the control system may be exposed to relatively high levels of water vapor, humidity, or other potentially corrosive and destructive gases and fluids. Thus, the circuits within the housing of the control system must be protected from the environment outside the housing.

Placing holes through the walls of such housings for placement of push button silencing alarms can compromise the NEMA rating of the housing. Although gaskets with oiltight push button switches can be used, adapting a housing to include such a button without compromising the NEMA rating of the housing can add to the complexity and cost of the manufacture of the control system. As a result, there exists a need for an improved housing for wastewater control panels which enables alarms to be silenced without opening the housing and which is adapted to minimize the opportunity for environmental conditions outside the housing from degrading the circuits and other components inside the housing.

DISCLOSURE OF INVENTION

It is an object of an exemplary form of the present invention to provide a fluid level sensing and control system.

It is a further object of an exemplary form of the present invention to provide a fluid level sensing and control system for wastewater environments.

It is a further object of an exemplary form of the present invention to provide a fluid level sensing and control system which resists penetration of water and other fluids.

It is a further object of an exemplary form of the present invention to provide a fluid level sensing and control system which is adaptable to changing requirements for a wastewater system.

It is a further object of an exemplary form of the present invention to provide a fluid level sensing and control system which is upgradeable in the field.

It is a further object of an exemplary form of the present invention to provide a fluid level sensing and control system which is less expensive to manufacture relative prior art systems.

It is a further object of an exemplary form of the present invention to provide a fluid level sensing and control system which is operative to prevent start capacitors for pumps from being damaged.

It is a further object of an exemplary form of the present invention to provide a fluid level sensing and control system which is capable of automatically generating an alarm signal.

It is a further object of an exemplary form of the present invention to provide a fluid level sensing and control system which is capable of silencing the alarm signal in response to an input from an operator without opening a housing for the system.

Further objects of exemplary forms of the present invention will be made apparent in the following Best Modes for Carrying Out Invention and the appended claims.

The foregoing objects are accomplished in an exemplary embodiment of the invention with a fluid level sensing and control system which is adapted to be easily configured and/or upgraded to meet the current and future requirements of a wastewater system. An exemplary embodiment may include a housing which comprises therein mounting features for different types and versions of interface input/output devices, circuit boards, relays, and other types of devices used to measure and control fluids. The housing may include a door which provides access to the interior of the housing. For housings that meet the requirements of one or more NEMA standards related to water and other chemical resistance, the door and/or housing may include one or more gaskets, tongue and groove cooperating members, and other sealing features which are operative to prevent fluids such as water from entering the housing.

In an exemplary embodiment, the interior of the housing may include a back panel which is adapted for use to securely mount electrical components such as circuit breakers, contact relays, start capacitors, overload devices, and/or other components used for electrically controlling pumps. In the exemplary embodiment, the interior of the housing may also include a sub-door in hinged connection with the housing. The sub-door may pivot between an open position and a closed position. By placing the sub-door in an open position, the components mounted to the back panel can be accessed. When the sub-door is in the closed position, the sub-door may extend between the walls of the housing with a sufficient size that enables the sub-door to prevent a user's hand from contacting unshielded portions of the electrical components mounted to the back panel.

In an exemplary embodiment, the sub-door may include an inner side and an outer side. When the sub-door is in the closed position, the outer side faces outwardly toward the opening of the housing, while the inner side faces inwardly toward the back panel. In an exemplary embodiment the inner side of the sub-door is adapted to receive mounted thereto one or more circuit boards.

The sub-door may further include one or more apertures therethrough. The apertures may have sizes which enable one or more user interface input/output devices or other components mounted to the sub-door or the back panel to be accessible to a user when the sub-door is in the closed position. Examples of components which may be accessible include circuit breaker switches, test/silence alarm buttons, hand run buttons, toggle switches, digital displays, programming buttons, LEDs, dials, and any other input or output device which is useful for controlling and monitoring wastewater systems.

In an exemplary embodiment the back panel may be injection molded with raised mounting elements such as a raised platform for mounting circuit breakers. The raised platform may have a sufficient height relative the back of the housing to enable the switches of the circuit breakers to extend through an aperture in the sub-door when the sub-door is in the closed position. The back panel may also include other mounting features, including brackets adapted to mount capacitors to the back panel.

An exemplary embodiment of the invention includes at least one computer processor. In the exemplary embodiment a main processor is included on a main circuit board which is mounted to the inside of the sub-door. The processor and associated circuitry (hereafter referred to as the main circuit board) is operatively programmed and configured to acquire information from components and control the operation of components in the system. In exemplary embodiments such components may include devices for controlling pumps such as power contactors, overload protection devices, and start relays. In addition such components may include input/output devices such as an alarm flasher, audible relay, audible silence relay, seal fail relay, hand/auto operation switch, and run lights. Also, the main circuit board may be operative to provide user interface input/output devices to enable users to configure the system.

In exemplary embodiments of the system, an optional circuit board may be provided which includes additional user interface features and other functionality. Such an optional circuit board may include a further processor, a digital display device, buttons and other user interface features. In exemplary embodiments the optional circuit board may be mounted to the inner side of the sub-door. The sub-door may include apertures adapted to provide visibility and/or access to a digital display and/or buttons respectively of the optional circuit board therethrough. In exemplary embodiments the optional circuit board may be programmed to provide features such as an elapsed pump operating time meter, pump off/on cycle counter, liquid level display, time dosing applications, measurement logs, alarm condition annunciations, telemetry, and communications with remote devices.

In an exemplary embodiment, the processor of the main circuit board is operative to turn on one or more pumps that are operative to pump fluids in a wastewater system. For single phase motors, the main board is operative to activate a start relay that is in operative connection with start windings of the pump. An overload device may be operative to measure the level of current in the AC circuit used to power the run windings of the motor of the pump. The processor may be operatively configured to monitor the measured current for the pump as the pump is being started. When the current falls to a predetermined level, the processor is operative to cause the start relays to deactivate the start windings. In the exemplary embodiment the predetermined level is chosen to correspond to the level of current at which the pump should reach a desired level of speed which is less than full operating speed.

Exemplary embodiments of the processor may further be operative to measure the amount of time that has elapsed since the start windings were activated. In addition to deactivating the start windings responsive to a current measurement, the processor may further deactivate the start windings after a predetermined amount of time has elapsed since the start windings were activated.

In the exemplary embodiment, the processor may be operative to monitor the sinusoidal changes in the current of the AC circuit powering the run windings of the motor of the pump through use of the overload device. To reduce wear on the contact relay when the pump is started and stopped, the processor may be operative to time the point when the contact relay opens or closes the circuit for the run windings to about correspond to the cross-over point or zero power point of the sinusoidal change in current or voltage in the AC circuit. For example, the processor may cause the contact relay to power the run windings and/or remove power from the run windings responsive to the current or voltage of the AC circuit being within a predetermined amount of time before or after the cross-over point for the AC circuit. In an exemplary embodiment the predetermined amount of time may, for example, be about 1 millisecond.

In further exemplary embodiments a device for silencing an alarm may be accessed from outside the housing which encloses the main circuit board and other components of the system. Such a device may include a touch sensor pad or plate mounted within the housing. Such a plate may be operative to experience a change in capacitance in response to a user's hand placed near the plate on the outside of the housing. The processor of the main circuit board may be configured to receive a signal indicative of the change in capacitance of the touch sensor plate and in response thereto cause one or more alarms to be silenced.

BEST MODES FOR CARRYING OUT INVENTION

Figure 1:
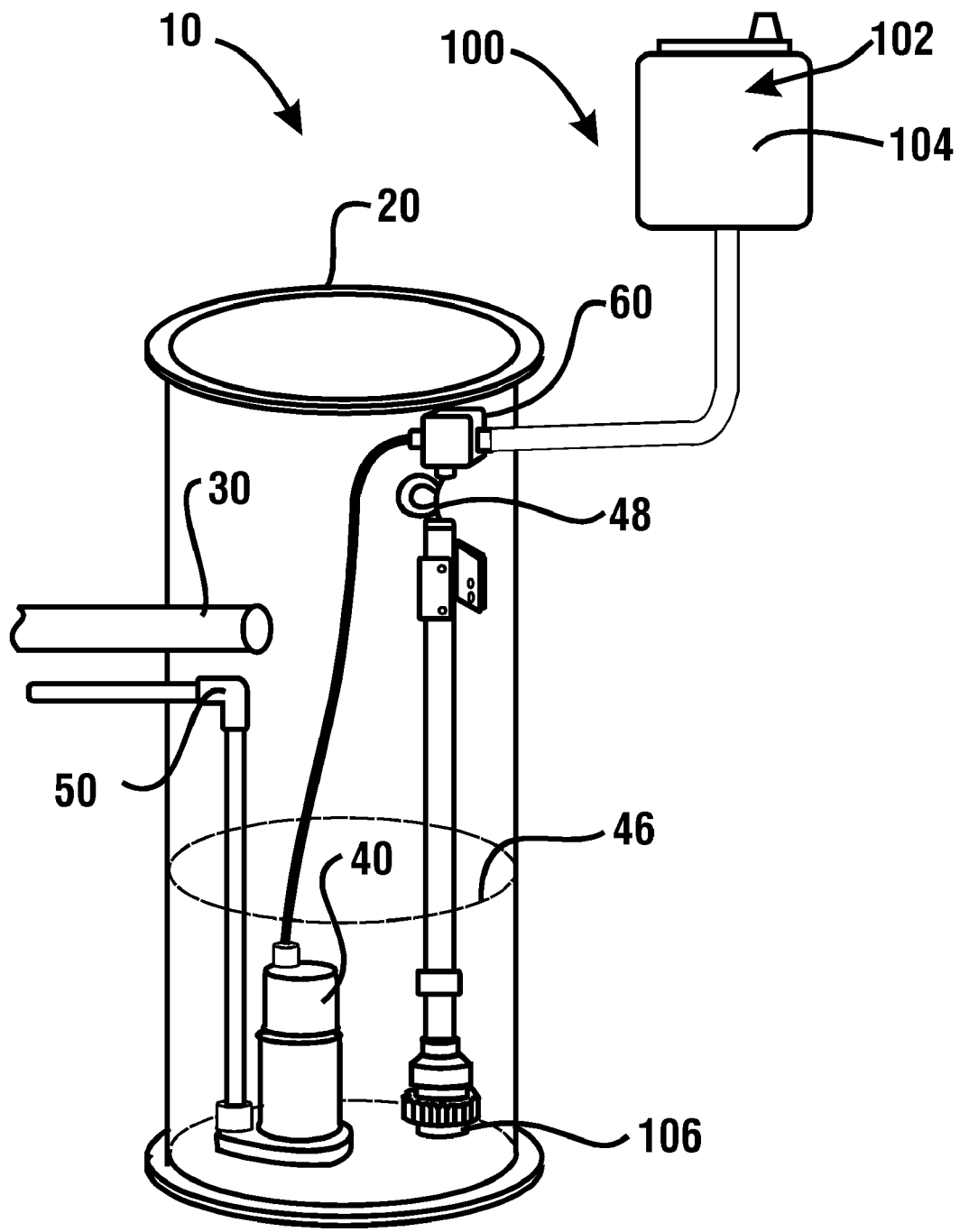
FIG. 1 is a schematic view of an exemplary embodiment of a wastewater system.

Referring now to the drawings, FIG. 1 depicts an example of a wastewater system 10 in accordance with an exemplary embodiment. The system may include a fluid-holding vessel or tank 20, a fluid inlet line 30 for bringing fluidized material into tank 20, and a fluid pump 40 for discharging fluid material from vessel 20 via a discharge line 50. The exemplary embodiment may further include a fluid level sensing and control system 100. The system may include a control panel 102 with a plurality of different components mounted within a housing 104.

In this described exemplary embodiment, the system 100 includes a fluid level sensing device such as a pressure bell 106 and a tubing 48 in operative connection between the pressure bell 106 and the control panel 102. Here, the pressure bell is operative responsive to the pressure of the fluid 46 to change the pressure of gases in the tube. The control panel 102 may include a transducer which is operative to provide a signal responsive to the pressure of the gases in the tube. Such a signal may be representative of the depth of the fluid 46 in the reservoir. Examples of fluid level sensing devices are shown in U.S. Pat. No. 6,595,051 of Jul. 22, 2003 and U.S. Pat. No. 6,443,005 of Sep. 3, 2002 which are both incorporated by reference herein. Alternative exemplary embodiments of the present invention may use other fluid level sensing devices such as floats or other sensors mounted in the reservoir at known positions for example.

In the described exemplary embodiment, the control panel 102 is operative to monitor conditions associated with the wastewater system such as the depth levels of the fluid 46. Responsive to the depth level, the control panel is operative to turn one or more pumps 40 on and off to maintain the level of the fluid below a threshold.

Although the described exemplary embodiment is operative to cause pumps to move water out of the tank 20, it is to be understood that in alternative exemplary embodiments, the system may include valves, or other fluid control devices which are operative to control either or both of the input and output of fluids into the tank.

Although exemplary embodiments are described herein as being responsive to conditional signals representative of a depth level of a fluid, in further exemplary embodiments the system may monitor and be responsive to other condition signals. Such other condition signals may, for example, include the health of various components of the system such as pumps, valves, and other devices. The control panel may be configured to determine that an alarm should be activated responsive to one or more of the conditions signals corresponding to one or more alarm levels specified using the control panel.

Figure 2:
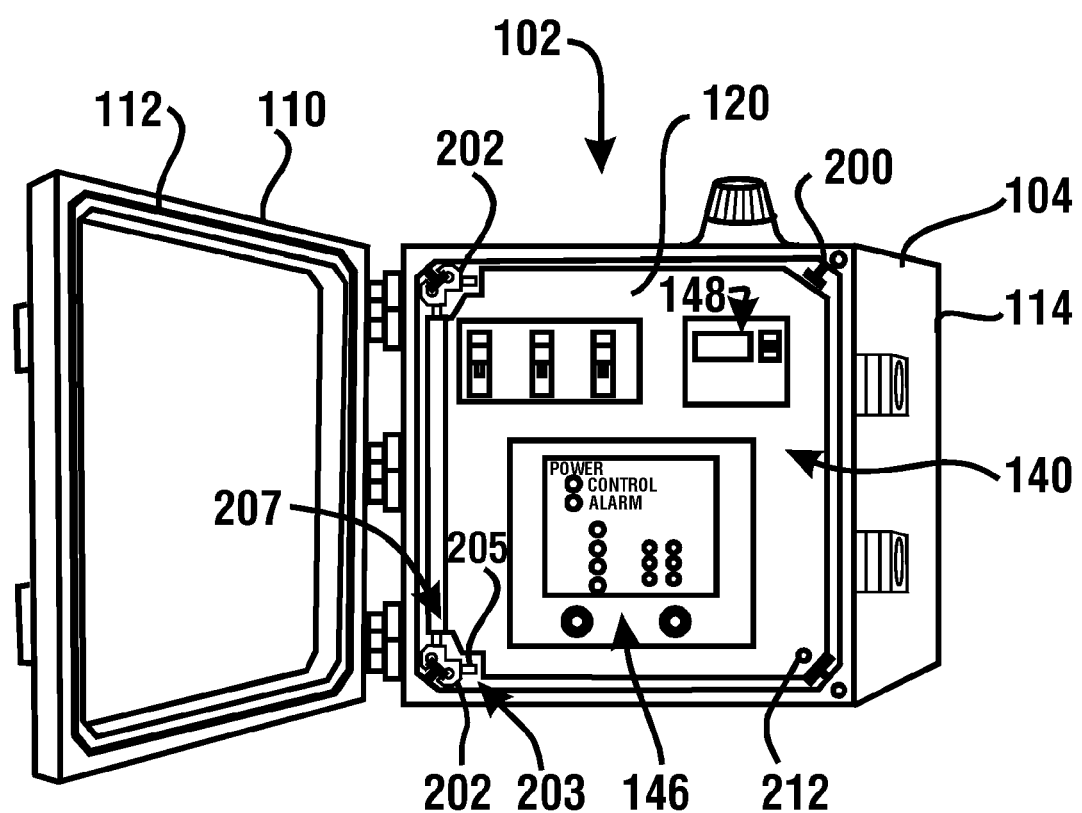
FIG. 2 is a perspective view of an exemplary embodiment of a control panel for a wastewater system.

FIG. 2 shows an example of one exemplary embodiment of a control panel 102 for use with exemplary embodiments of fluid level sensing and control systems. Here the control panel 102 includes a housing 104. The housing may be comprised of different materials such as stainless steel, plastic, or other materials, depending on the intended environment for which the control panel will be exposed. In this described exemplary embodiment the housing is comprised of a nonconductive material such a polycarbonate. Also, in this described exemplary embodiment, the housing includes a hinged door 110. The door includes a gasket 112 which is operative to provide a water resistant seal when the door is latched into a closed position with the body 114 of the housing. Although, in this described exemplary embodiment the door includes the gasket 112, it is to be understood that in alternative exemplary embodiments the gasket may be mounted to the body of the housing and/or other sealing devices and features may be used to enable the housing to prevent or at least minimize the opportunity for fluids such as water or corrosive fluids and gases from entering the housing. In exemplary embodiments, the features of the control panel described herein enable the housing to meet the requirements of the National Electrical Manufacturers Association (NEMA) 4X standard for water and other fluid penetrations.

Figure 3:
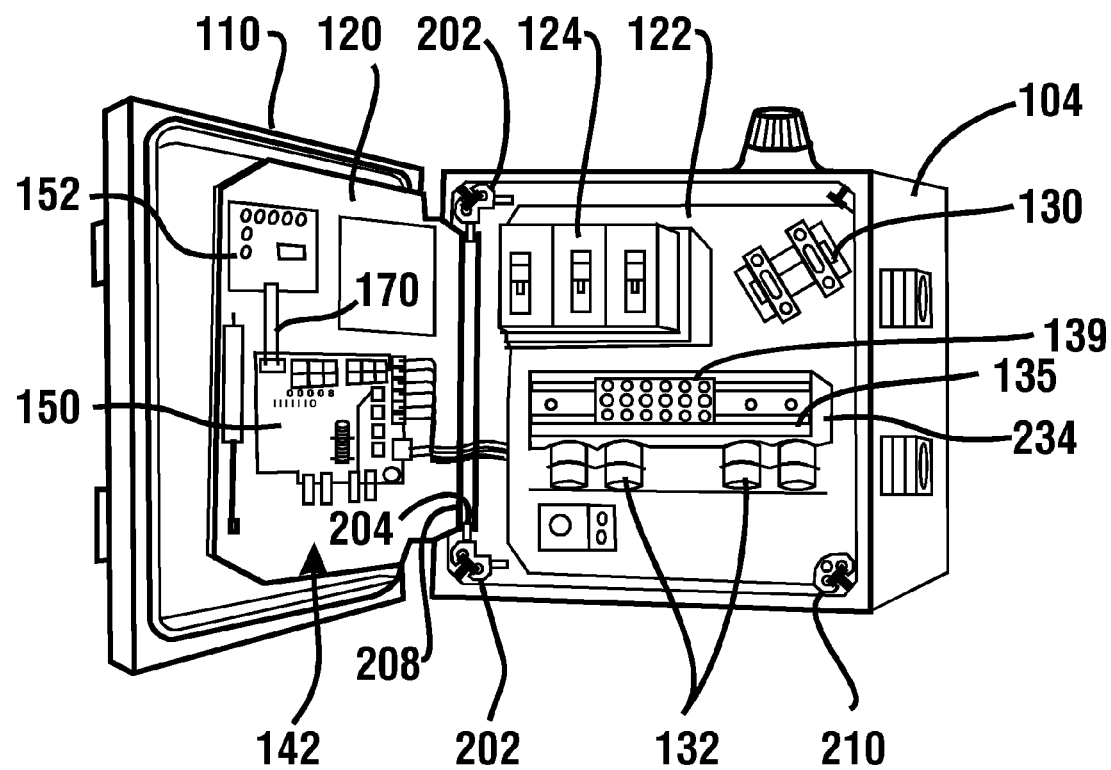
FIG. 3 is a further perspective view of an exemplary embodiment of the control panel.

In an exemplary embodiment, the control panel 102 may include two mounting panels in operative connection with the housing. As shown in FIG. 2, a first one of the mounting panels includes a sub-door 120 that is in hinged connection with the housing. In FIG. 2, the sub-door is shown in a closed position. As shown in FIG. 3, the sub-door 120 is operative to pivot to an open position which provides a user with access to a second one of the mounting panels. In this described exemplary embodiment, the second one of the mounting panels corresponds to a back panel 122 mounted adjacent the inner back wall of the housing. The back panel is adapted to hold components which may have potentially hazardous unshielded electrical connections. Such components, for example, may include contact relays 130 for use in powering one or more pumps. Such components may also include start capacitors 132 and start relays for use with activating start windings in the motors of single phase pumps. Such components may also include circuit breakers 124 coupled to different electrical portions of the control panel.

As shown in FIG. 2, when the sub-door is in the closed position, the sub-door has a sufficient size, shape and surface area to cover the unshielded portions of components mounted to the back panel and prevent a user's hand and fingers from touching unshielded portions of components mounted to the back panel. As a result, the sub-door provides additional safety for a use against accidental electrical shock when configuring the control panel.

The sub-door may be comprised of plastic, stainless steel, or any other materials which are operative to support components of the control panel. In this described exemplary embodiment the sub-door is comprised of a nonconductive material such as a polycarbonate which is injection molded to include features for mounting different types of components.

As shown in FIG. 2, the sub-door includes an outer face 140 which is adapted to receive mounted thereto a plurality of input and output devices 146, 148. The input and output devices of the sub-door are viewable and/or accessible to a user when the sub-door is in the closed position. Such input and output devices may include for example indicator lights such as LEDs, push buttons, control dials, digital displays, and other user interface features which enable a user to gather information and/or control the operation of a wastewater or other fluid system.

Figure 4:
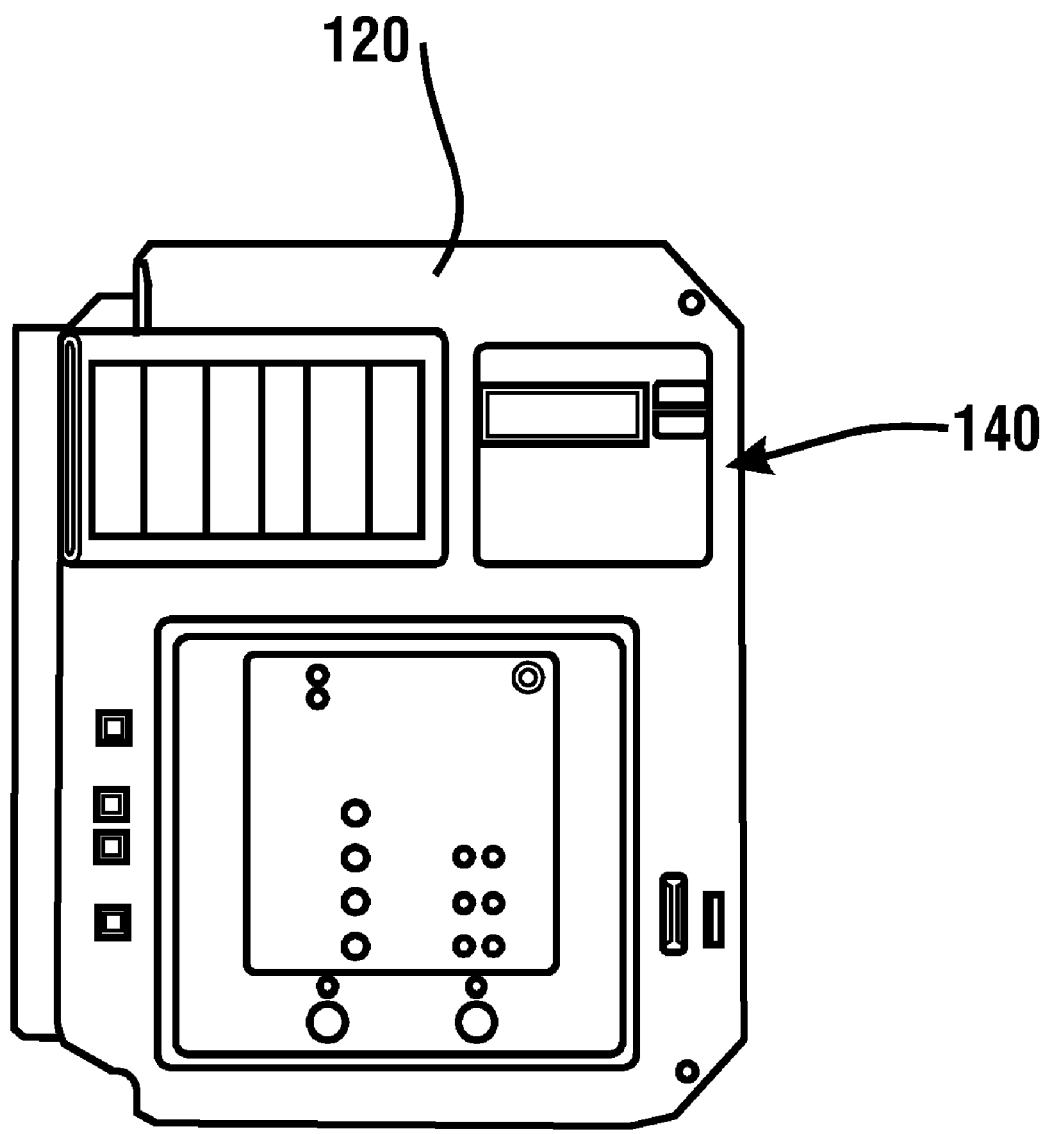
FIG. 4 is plan view of an outer side of an exemplary embodiment of a sub-door of the control panel.
Figure 5:
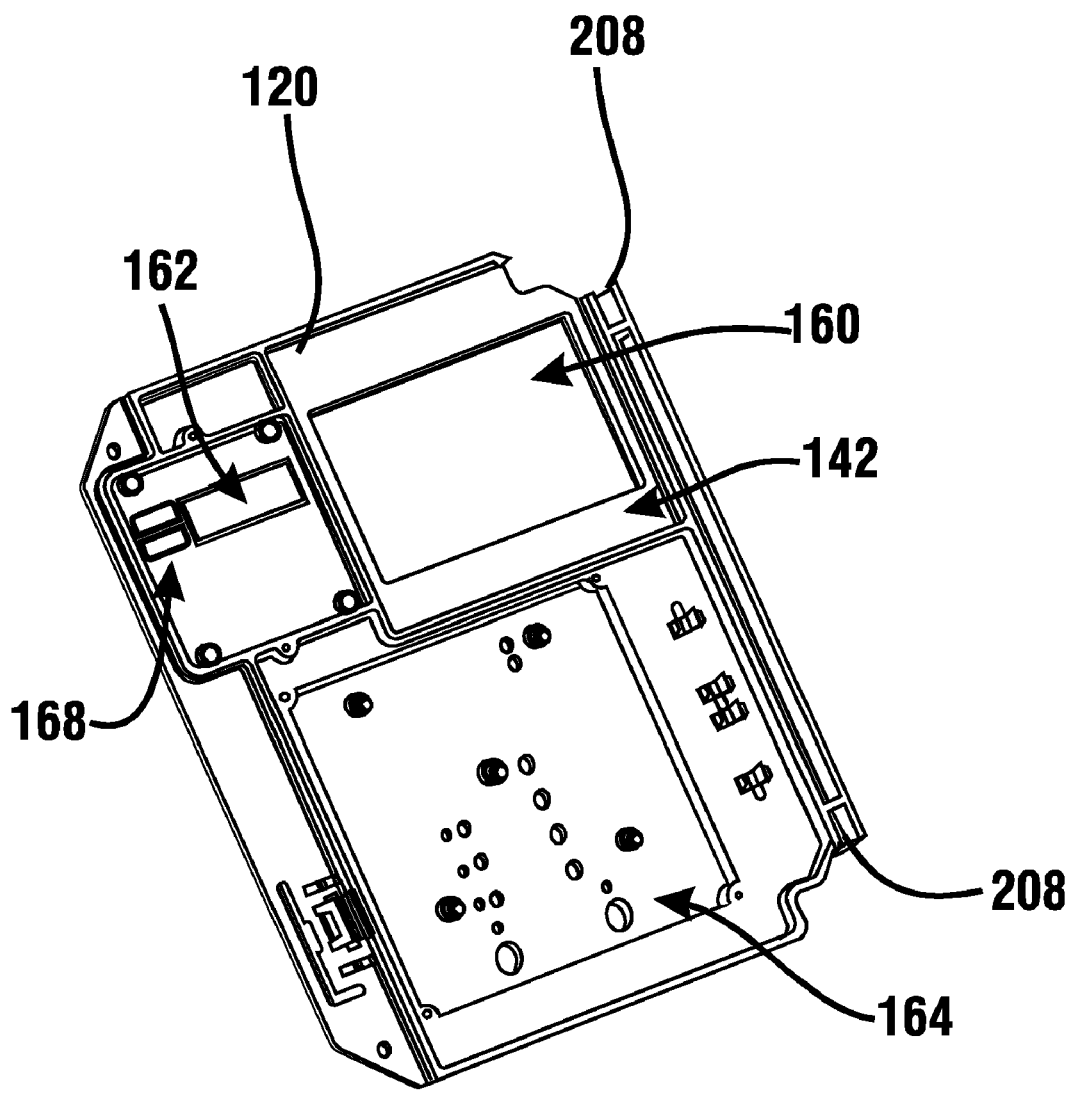
FIG. 5 is a perspective view of an inner side of the sub-door.

As shown in FIG. 3, the sub-door further includes an inner side 142. The inner side is accessible to a user when the sub-door is in the open position. The inner side 142 may be adapted to receive mounted thereto one or more circuit boards 150, 152 or other components which are configured and/or programmed to output information using the output devices and receive information using the input devices of the sub-door. FIG. 4 shows an example of the outer side 140 of the sub-door without components mounted thereto. FIG. 5 shows an example of the inner side 142 of the sub-door without components mounted thereto.

In an exemplary embodiment, the sub-door includes a plurality of apertures 160, 162, 164, 168. When the previously described circuit boards are mounted to the inner side of the sub-door, the apertures are operative to receive therethrough or at least make accessible or viewable input and output devices mounted to the circuit boards.

As shown in FIG. 3, the sub-door may include a first or main circuit board 150. The main circuit board may include a computer processor and associated circuitry which is operatively configured and programmed to perform a default set of functions. Such functions may include activating the relays which start, run and stop one or more pumps for example. Such functions may also include determining the depth level of the fluid. Such functions may also include enabling a user to provide a plurality of different depth levels or other threshold information which is used by the main circuit board to determine when to start and stop pumps and when to activate one or more visible, audible, or other alarm signals. In an exemplary embodiment, pumps and alarms may be operational in the control panel without the addition of further circuit boards to the sub-door.

However, the exemplary embodiment of the sub-door is further adapted to receive additional optional circuit boards 152. Such optional circuit boards may provide additional user interface features with additional input and output devices that are accessible to a user from the outer side of the sub-door.

In an exemplary embodiment, an optional circuit board may include a digital display device that is viewable through an aperture 162 (FIG. 5) of the sub-door. The sub-door may include further apertures 168 which enable a user to access additional input devices such as buttons located on the optional circuit board.

The optional circuit board may be placed in operative electrical communication with the main circuit board with one or more communication lines 170 (FIG. 3). In the exemplary embodiment, the processor of the main circuit board is operatively programmed to provide information to the processor of the optional circuit board. Such information may include the depth level of the fluid, the status of pumps and alarms, and/or any other information which is available to the main circuit board.

The processor of the main circuit board may further be operatively programmed to be responsive to commands from the processor of the optional circuit board to alter its default programming. For example, the processor of the optional circuit board may be operative to send the processor of the main circuit board commands to start and stop various pumps and alarms. The processor of the main circuit board may be operative to control the operation of the pumps and alarms responsive to the commands from the processor of the optional circuit board.

In addition, the processor on the main circuit board may also be adapted to accept updates to code, additional code and/or complete upgrades to its programming code which are received from the processor of the optional circuit board. For example, a user may install a new optional circuit board to a pre-existing control panel. Such an optional circuit board may include a memory which is used to store programming code such as firmware instructions intended for use with upgrading the main board. When the optional circuit board is connected to the main circuit board, both boards may be adapted to undergo a handshaking protocol which enables the optional circuit board to upgrade the processor on the main board with the new/additional code. Such a protocol may include the circuit boards swapping version, security information and/or other information which can be used by the boards to verify that the new code should be permitted to be installed on the main board. Examples of components which may be used to provide upgrade functionality of the main circuit board from an optional circuit board include the flash PICmicro® microcontroller devices by MicroChip®.

In further exemplary embodiments, the sub-door may be operative to receive additional optional circuit boards. Such additional optional circuit boards may be mounted in stacked relation with the previously mounted optional circuit boards. In an exemplary embodiment, when a control panel does not have an optional circuit board mounted therein, the sub-door may include a face plate which snaps onto the sub-door and covers the apertures 162, 168 on the sub-door.

Exemplary embodiments of the optional circuit boards may provide a digital display of the depth level, alarm information, or any other information available to the main board and optional circuit boards. Further the optional circuit boards may provide other additional functions to the control panel. Such functions may include an elapsed pump operating time meter, pump off/on cycle counter, liquid level display, time dosing applications, measurement logs, alarm condition annunciations, telemetry and other communications with remote devices.

Referring back to FIG. 2, exemplary embodiments of the control panel may include a housing 104 which includes T-shaped rails or brackets 200 extending inwardly adjacent inner corners of the housing body. The T-shaped rails may be used to mount components in the housing. However, it is to be understood that in other exemplary embodiments, other types of housings and mounting brackets or rails may be used.

Figure 6:
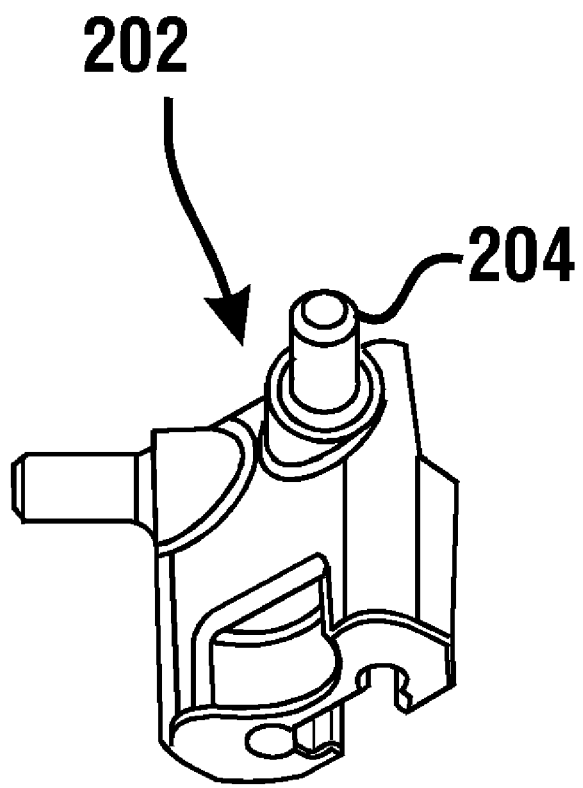
FIG. 6 is a perspective view of an exemplary embodiment of a hinge bracket.
Figure 7:
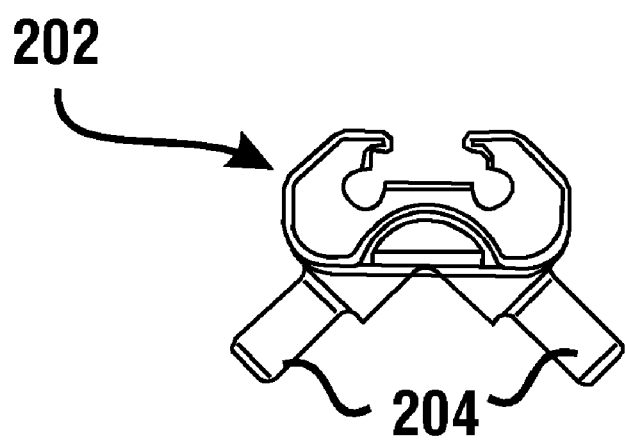
FIG. 7 is a plan view of the hinge bracket.

To enable the sub-door to be in hinged connection with the housing, the exemplary embodiment may include hinge brackets 202 which are adapted to mount to the T-shaped rails of the housing. As shown in FIGS. 6 and 7, the hinge brackets 202 include at least one cylindrical projection 204. When two of the hinge brackets are mounted to the T-shaped rails of the housing (FIGS. 2 and 3) the projections are coaxially aligned and provide a mounting point for the sub-door. As shown in FIG. 5, the sub-door includes two concave flanges or grooves 208 on one side of the sub-door which are adapted to snap onto the projections 204 of the hinge brackets 202 (FIG. 3). The exemplary embodiment of the sub-door is operative to pivot on the projections 204 of the hinge brackets between the previously described closed position (FIG. 2) and open position (FIG. 3). When mounted to the projections 204, the concave flanges 208 may be operative to extend more than 180 degrees around the projections to mechanically hold the sub-door to the housing.

In exemplary embodiments, the sub-door is operative to snap onto and off of the projections of the hinge brackets without the use of tools to enable the control panel to be easily manufactured and to enable an existing sub-door on a control panel to be easily replaced with a further sub-door. Exemplary embodiments of the hinge brackets may include two projections oriented at 90 degrees. Such brackets may be mounted on either an upper or lower T-shaped rail and be able to provide at least one projection which is orientated vertically 207. Exemplary embodiments of the sub-door may further include cut out portions 203 in the location of the non-used horizontal projections 205 for each hinge bracket when the sub-door is in the closed position.

As shown in FIG. 3, exemplary embodiments may further include a threaded mounting bracket 210 which is also adapted to mount to a T-shaped rail of the housing. The threaded mounting bracket may include a threaded aperture which is operative to receive a threaded locking bolt. As shown in FIG. 2, the threaded locking bolt 212 may extend through the sub-door 120, in aligned relation with the threaded bracket. The locking bolt 212 may then be rotated clockwise into the threaded bracket to lock the sub-door in the closed position. The locking bolt may then be rotated counter-clockwise out of the threaded bracket to enable the sub-door to pivot to the opened position.

Figure 8:
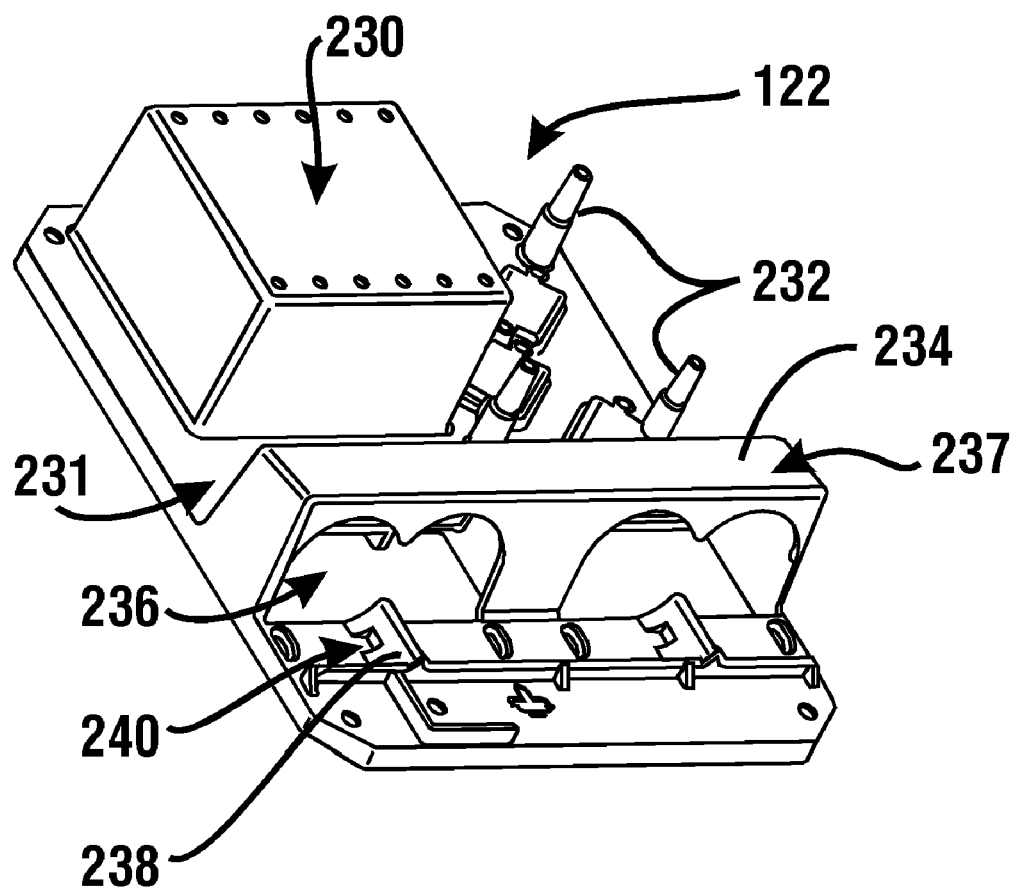
FIG. 8 is a perspective view of an exemplary embodiment of a back panel of the control panel.

FIG. 8 shows an exemplary embodiment of a back panel 122 without components mounted thereto. The back panel may be adapted to mount adjacent the back inner wall of the housing. The back panel may be comprised of plastics, stainless steels or any other material which is operative to support components of the control panel. In this described exemplary embodiment, the back panel is comprised of a nonconductive material such as a polycarbonate which is injection molded to include features for mounting different types of components.

An exemplary embodiment of the back panel may include a raised platform 230 which is adapted to receive one or more circuit breakers mounted thereto. The raised platform may have a height relative the back wall of the housing which places the switches of the circuit breakers adjacent or through an aperture 160 (FIG. 5) of the sub-door.

The back panel may also include raised bosses 232 and/or other molded in brackets for mounting one or more relays for use with controlling the operation of pumps. The back panel may also include a raised bracket 234 with circular openings 236 therethrough for mounting one or more start capacitors to the back panel. The back panel may further include angled or curved ramps 238 with slots 240 therethrough for receiving tie downs or other straps for rigidly holding the capacitors to the back panel.

The raised bracket 234 may further include an upper surface 237 oriented at an acute angle with respect to the back inside surface of the housing and/or back panel 231. As shown in FIG. 3, a terminal block 139 may be mounted to the upper surface 237 of the raised bracket 324 either directly or through use of a rail 135. The terminal block may be used to organize and/or label the various electrical connections between components of the control panel (e.g. circuit breakers, relays, main circuit board, and alarms) and other portions of the waste water system (e.g. pumps, floats, incoming power). Orientating the upper surface 237 at a non-parallel angle with respect to the back inside surface of the housing, provides the end user with a more convenient angle to connect and disconnect wires to the terminal block using a screw driver or other tool.

Figure 9:
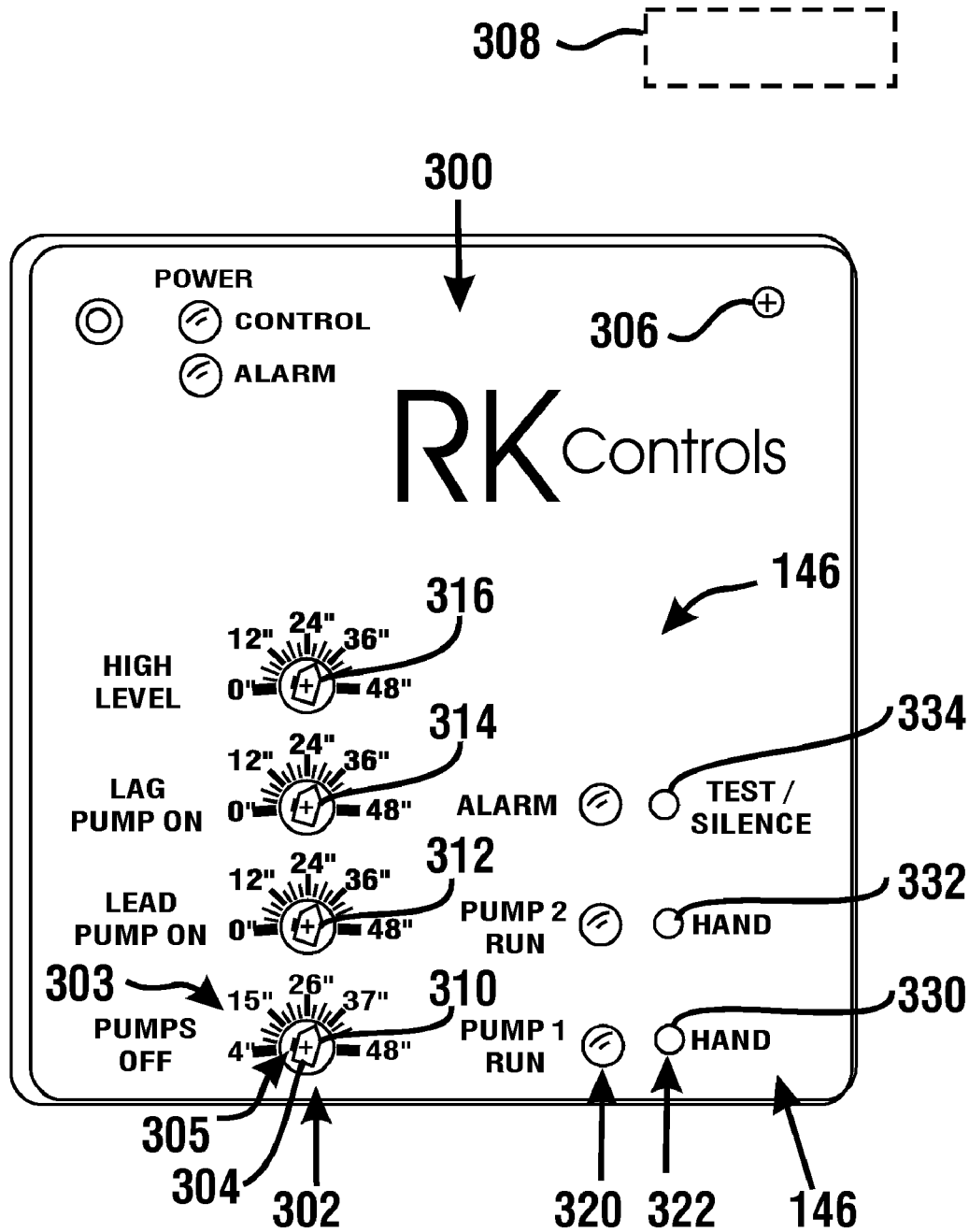
FIG. 9 shows an exemplary embodiment of a user interface area of the sub-door.

FIG. 9 shows an example of one of a plurality of different configurations for a user interface area 300 on the outer side of the sub-door. Here the user interface area 300 provides access to a plurality of input and output devices 146 which are included on the main board positioned on the inner side of the sub-door. In this exemplary embodiment of the control panel, the user interface may include a plurality of fluid depth level selection devices 302. Here the fluid depth level selection devices correspond to rotatable dials which by changing the angular position of the dials, enable a user to select a depth level associated with functions of the control panel.

For example a first one of the selection devices 310 enables a user to select the depth level at which the processor of the main circuit board causes pumps associated with the system to be turned off. A second selection device 312 enables a user to select the depth level at which the processor of the main circuit board causes a first pump to be turned on to move fluid out of a tank. A third selection device 314 enables a user to select the depth level at which the processor of the main circuit board will cause a second or lag pump to be turned on to move fluid out of the tank. A fourth selection device 316 enables a user to select the depth level at which the processor of the main circuit board will cause a high fluid level alarm to be output by the control panel.

The exemplary embodiment of the user interface area 300 may further include a plurality of output devices 320 which indicate the current operating status of the control panel. Such output devices may include for example LEDs which indicate which pumps are currently operating and whether or not an alarm signal is being outputted by the control panel.

The exemplary embodiment of the user interface area 300 may further include command buttons 322 which cause the main board to perform different functions. For example, the command buttons may include push buttons 330 and 332 associated with each pump. The processor of the main circuit board may be responsive to these buttons being engaged by a user to immediately turn on the pump associated with the button. In an exemplary embodiment, the pumps may continue to run until either the button is engaged again or the depth level of the fluid falls to the level selected by the pump off selection device 310.

In an exemplary embodiment, when the depth level of the fluid in the tank is at or lower than the depth level selected by the pump off selection device 310, the main board may be operative to change the behavior of the push buttons 330, 332 to that of momentary contact buttons in which the pump only operates while the button continues to be pressed by a user. As a result when the user removes his finger from the button, the pumps will automatically stop to prevent the pump from running dry.

In this described exemplary embodiment, the user interface area 300 may further include a push button 334 associated with the control panel alarms. Pressing the alarm push button 334 when an audible and/or visual alarm is not on, will cause the processor of the main circuit board to turn on the control panel alarms for use in testing the system. When the alarms are on, the alarm push button 334 is operative to silence one or more of the alarms so that the system can be attended to by a user without having to continually listen to an audible alarm for example.

The described exemplary embodiment of the user interface area 300 is only one example configuration for a user interface associated with exemplary embodiments of the control panel. It is to be understood that in alternative exemplary embodiments, components of the control panel may require different user interface input and output devices. For example, some exemplary embodiments of an associated wastewater system may only have one pump. As a result the user interface area and the main circuit board may only be configured to operate one pump. Further some exemplary embodiments of an associated wastewater system may have floats rather than a pressure bell. As a result, fluid depth level selection devices 302 may not be present on the corresponding user interface area and main circuit board of the control panel for such systems.

In exemplary embodiments of the system which include a digital display such as an alphanumeric LED panel 308, the system may be operative to cause the LED panel to display numerical values associated with the current position selector device being manipulated by a user. For example, if a user rotates one of the dials of the selection devices 302, the main processor associated with the system may be operative to cause the LED panel 308 to display a number representative of the depth level in inches or other units of length that the dial is currently associated with. Such an LED panel may provide a more accurate display of the position of the dial than can be determined from the relatively small hash marks and numerical labels 303 positioned around the dial.

FIG. 2, shows an example of a digital display 148 which is integrated into an optional circuit board. In this described exemplary embodiment, the main board is operative to communicate the numerical values associated with a selection device on the main board to the optional circuit board. The optional circuit board may then be operative to cause its digital display to output the numerical value provided by the main circuit board. In alternative exemplary embodiments, the main circuit board may include a digital display which is operative to output a numerical value indicative of the position of the selection devices 302 of the main board.

In exemplary embodiments which do not have a digital display either on an optional circuit board or on the main board, the main board may be operative to provide an electrical circuit for each selection device which is adapted to output a voltage potential which has a value in volts which corresponds to the value represented by the position of the dial of the selection device. For example as shown in FIG. 9, the dials 304 of each selection device may include a conductive surface contact point 305. A user may connect a hand held voltmeter to the conductive service 305 of the dial 304 and to a grounding conductive surface 306 located on the main board. The main board may include a circuit associated with the conductive surface 305 on the dial which is operative to cause the voltmeter to display a value in volts which represents the depth level in units or fractions of units of length associated with the current position of the selection device.

In an exemplary embodiment, a voltage measurement displayed by the voltmeter connected in this manner may be multiplied by ten to determine the corresponding depth in inches or other units of length of the fluid. For example, when the dial is turned to a position which represents a depth level of 15.14 inches, the voltage provided by the circuit associated with the dial and which is displayed by the voltmeter would be 1.514 volts. A user may then multiply this amount in volts by 10 to determine the corresponding value in inches at which the selection device is currently set.

Figure 14:
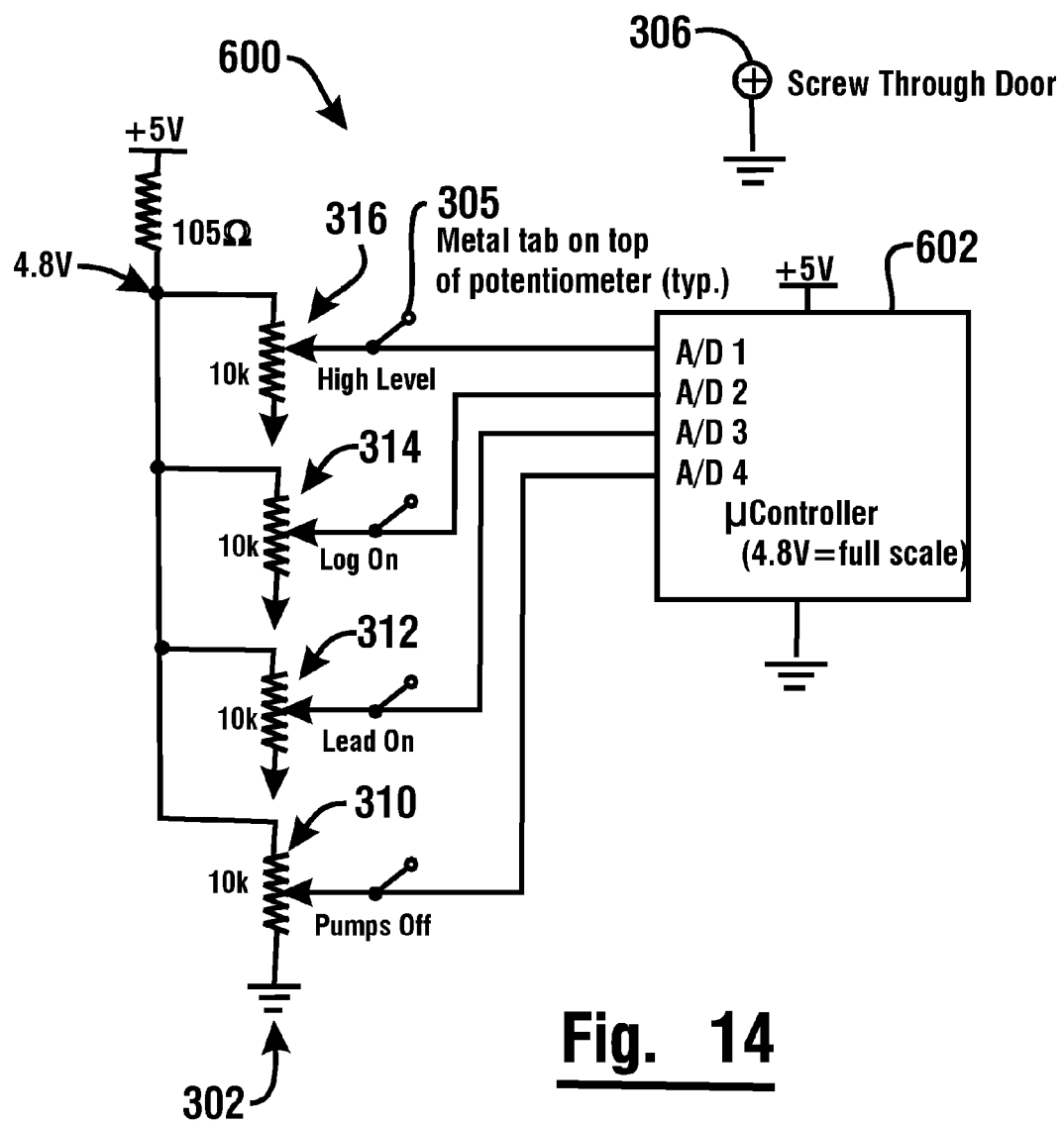
FIG. 14 shows a schematic view of a portion of the circuit on the main board which includes selection input devices and contact points for connecting a voltmeter.

FIG. 14 shows an exemplary embodiment of a portion of the circuit 600 on the main board which includes the selection devices 310-316. Here the selection devices include potentiometers which are in operative connection with a microprocessor 602 of the main board. In the exemplary embodiment, the processor is operative to control the pumps and alarms responsive to the positions of the selection devices as described herein. Each of the potentiometers may include a metal tab conductive surface 305 adjacent the portion of the dial which turns the potentiometer. Each metal tab shares a common electrical connection with the wiper output of the corresponding potentiometer and provides a location to measure the voltage associated with the position of the potentiometer using a voltmeter. The circuit shown in FIG. 14 also includes a ground 306 to which the voltmeter may also be connected. This grounding conductive surface may correspond to a grounded screw 306 (FIG. 9) or other metal surface which is accessible to the voltmeter when the sub-door is closed.

Figure 10:
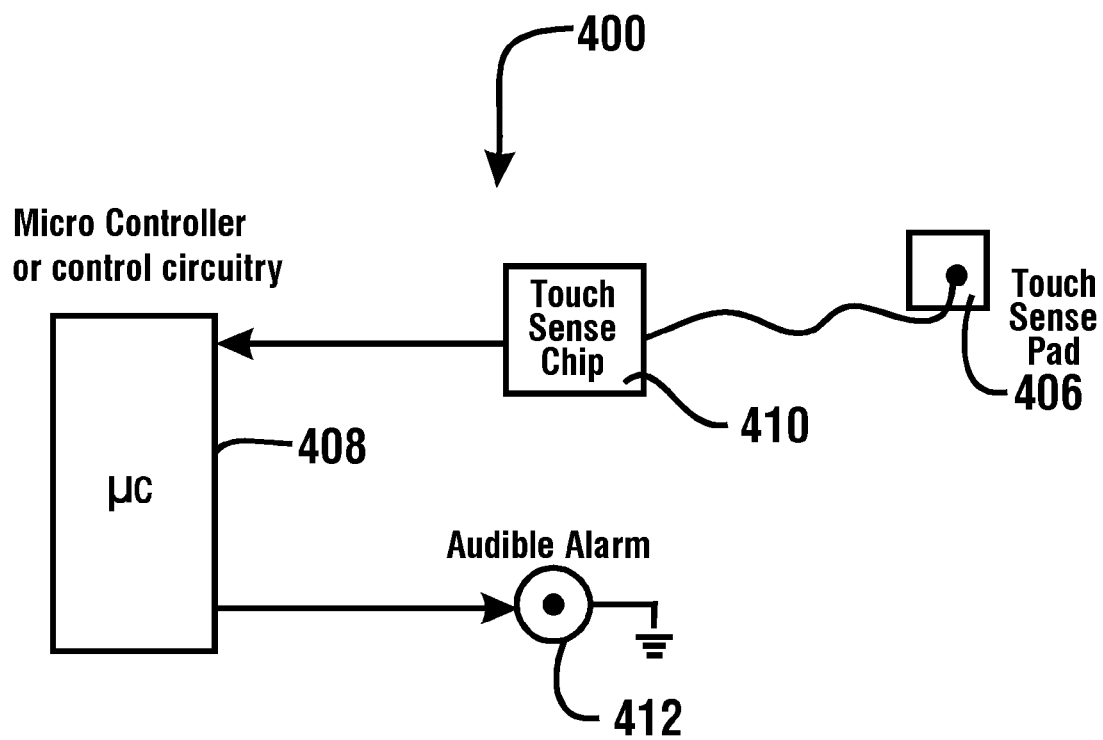
FIG. 10 shows a schematic view of an exemplary configuration of components operative to silence an alarm.
Figure 11:
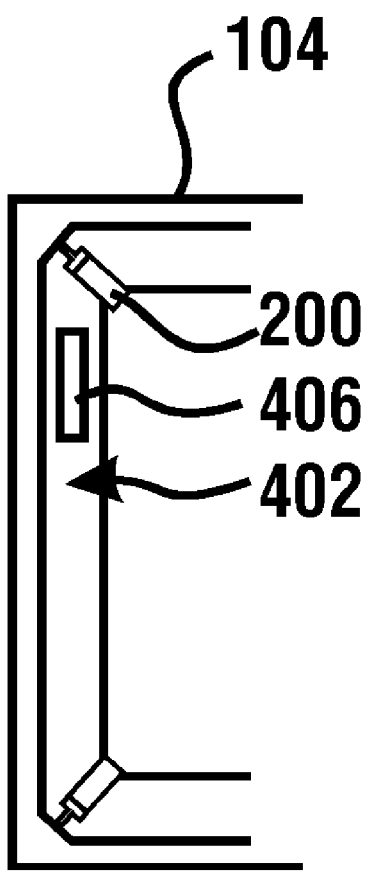
FIG. 11 shows an exemplary embodiment of a touch sense pad mounted to an inner wall of a housing of the control panel.
Figure 12:
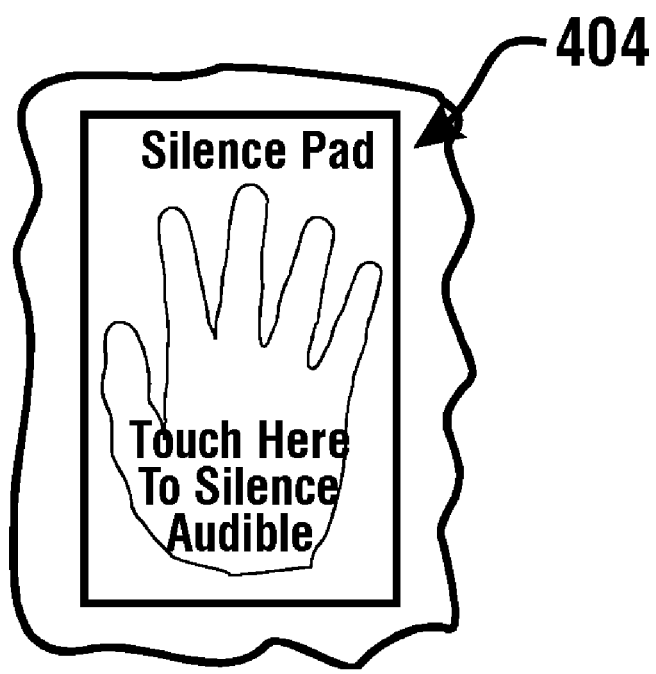
FIG. 12 shows a label mounted to an outside wall of the housing.

In exemplary embodiments, the control panel may have an alarm silence input device that can be activated by a user when the housing door is closed. FIG. 10 shows a schematic view of an exemplary embodiment for such an alarm silence input device 400. Here the device includes a touch pad such as a conductive metal plate 406. As shown in FIG. 11, the plate is mounted to an inside wall 402 of the housing 104. In this described exemplary embodiment, the housing is comprised of a nonconductive material which is operative to experience a change in capacitance as a result of a user placing his fingers, hand or other body part adjacent the touch pad on the outside of the housing. FIG. 12 shows a view of the outside surface 404 of the housing wall which corresponds to the position of the plate. To enable a user to locate the correct location on the housing which is adjacent the plate, the outside surface 404 of the housing may include a label, sticker, painted graphic, molded-in symbols, or other indicia which indicates to a user where the housing may be touched by the user to silence the alarm.

Referring back to FIG. 10, the control panel may further include a touch sensor chip 410 which is operatively programmed to provide a signal in response to the capacitance of the plate changing to a level which indicates the presence of a user's hand or fingers. Examples of such touch sensor chips include the QT110 Family of QTouch Sensors from Quantum Research Group Ltd.

The signal from the touch sensor chip 410 may be communicated to the processor 408 of the main circuit board of the system. In the exemplary embodiment, the processor 408 of the main circuit board may be programmed to cause one or more alarm signaling devices 412 to be silenced in response to the touch sensor chip providing a signal representative of the detection of a user's hand.

In an exemplary embodiment, the touch sensor pad may correspond to a 3 inch by 3 inch aluminum plate. In other exemplary embodiments the pad may correspond to a copper plane of a circuit board. In alternative exemplary embodiments other sizes, shapes and configurations of the pad may be used depending on the desired sensitivity for the device.

In alternative exemplary embodiments, the processor of the main circuit board may be programmed to test the alarm signaling devices 412 responsive to the detection of a user's hand adjacent the touch sensor pad. For example, when the alarm signaling device is in an inactive state and/or a condition signal does not correspond to an alarm level, the processor may activate the alarm signaling devices for a predetermined amount of time responsive to the touch sensor pad sensing a user's hand. The predetermined amount of time may be 10 seconds for example or some other amount of time which enables a user to verify that the internal and/or external alarm signaling devices connected to the system are working properly.

Figure 13:
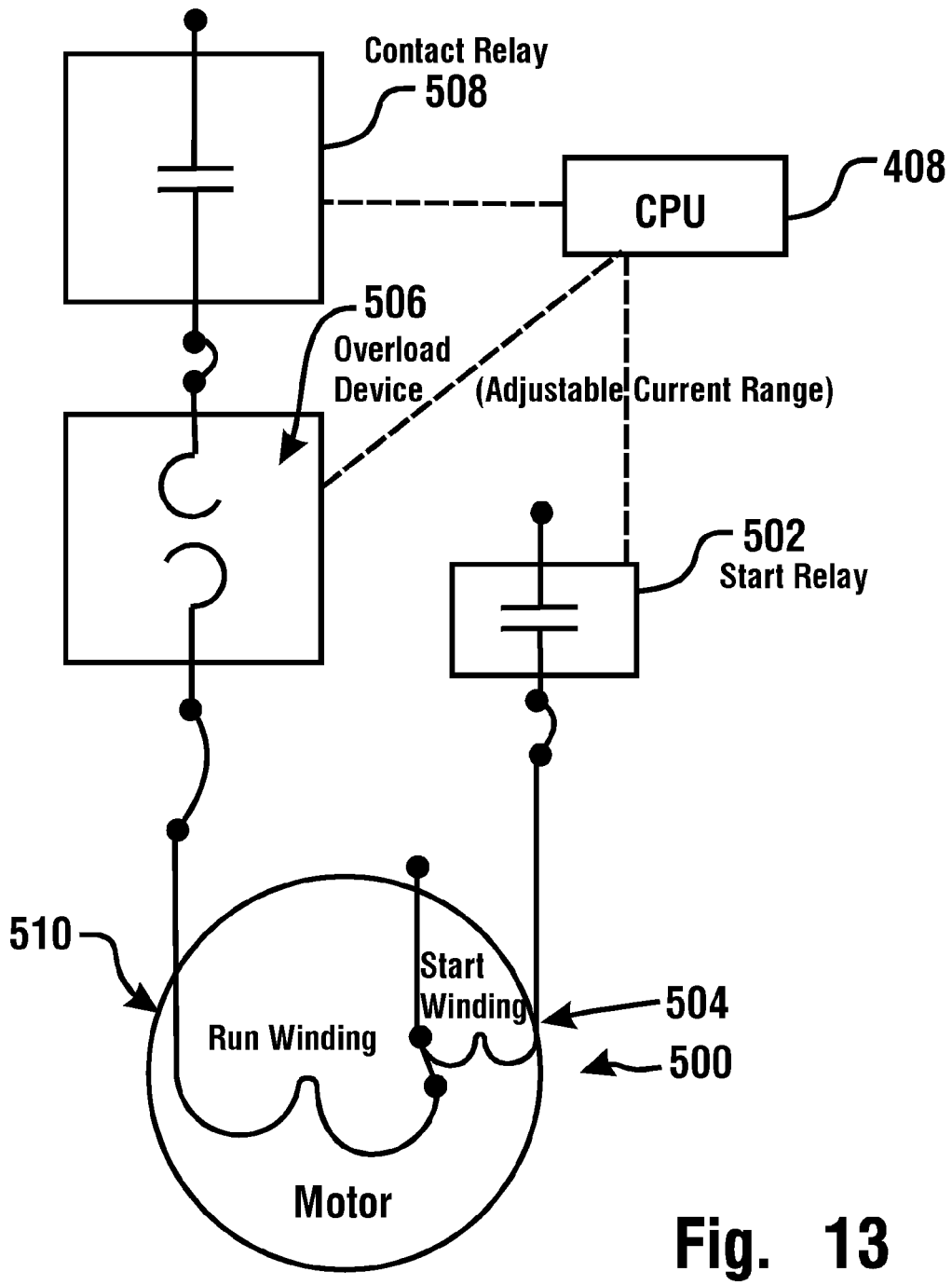
FIG. 13 shows a schematic view of an exemplary configuration of components for starting a single phase motor of a pump.

As discussed previously, exemplary embodiments of the control panel may be configured to start and stop single phase AC motor pumps. The motors of such pumps include start windings which the processor of the main circuit board is operative to temporarily cause to be powered for purposes of accelerating the motor of the pump. FIG. 13 shows a schematic view of some of the components involved with the starting of a motor 500 of a pump. Here the circuit may include a start relay 502 which is responsive to the processor 408 of the main board to open and close the circuit which provides current to activate the start windings 504 of the motor.

In the exemplary embodiment, start capacitors operate in parallel with the start windings 504. As the motor accelerates the voltage applied to the start capacitors increases. To prevent the start capacitors from being damaged, the processor 408 is operative to deactivate the start windings before the motor reaches full speed.

In this described exemplary embodiment, the control panel may include an overload device 506 which is operative to measure the current in the AC circuit which powers the run windings of the pump motor. The processor 408 may monitor the measured level of current by the overload device. When the processor determines that the measured level of current drops to a predetermined level, the processor may be operatively programmed to cause the start relay 502 to deactivate the start windings. In the exemplary embodiment, the predetermined level of current which triggers the start windings to be deactivated may correspond to a current level at which the motor reaches 75% of full speed for example. However, it is to be understood that in alternative exemplary embodiments, other predetermined levels of current and/or speed may be chosen for when to deactivate the start windings.

In the exemplary embodiment, the processor 408 may further be operative to determine the amount of time that has elapsed since the processor caused the contact relays to provide power to both the start windings 504 and the run windings 510 of the motor. When the amount of time that has elapsed has reached a predetermined amount of time, the processor may be operative to deactivate the start windings. In an exemplary embodiment the predetermined amount of time may correspond to about 1-3 seconds, for example.

In the exemplary embodiment, the processor may monitor the overload device or another circuit which is operative to measure the sinusoidal changes of the current in the AC circuit powering the run windings of the motor of the pump. The processor may be operative to time the point when the contact relay closes the circuit for the run windings to about correspond to the cross-over point or zero power point of the sinusoidal change in voltage in the AC circuit. The processor may be operative to time the point when the contact relay opens the circuit for the run windings to about correspond to the cross-over point or zero power point of the sinusoidal change in current in the AC circuit. For example, the processor may cause the contact relay to power and/or remove power from the run windings responsive to the current or voltage of the AC circuit being within a predetermined amount of time before or after the cross-over point for the AC circuit. The cross-over point corresponds to when the alternating current switches directions. In an exemplary embodiment the predetermined amount of time may for example be about 1 millisecond. In an exemplary embodiment, operating the contact relays within a predetermined amount of time of the cross-over point for the AC circuit may reduce the amount of wear on the contact relays and may enable the use of relatively smaller and relatively less expensive relays to control power to the run windings of the motor.

In addition to the described exemplary embodiments of the control panel, it is to be understood that other alternative exemplary embodiments may have other configurations with different sets of features and components. For example, control panels may be constructed with a limited subset of some of the features described herein. Further, other alternative exemplary embodiments may have other features useful for monitoring and controlling components in a wastewater system.

Thus the fluid level sensing and control system achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A control panel apparatus for a wastewater system comprising:
   a housing;
   at least one processor mounted within the housing, wherein the at least one processor is adapted to receive at least one condition signal representative of a condition associated with a reservoir comprising a fluid;
   at least one alarm output device in operative connection with the at least one processor, wherein the at least one processor is operative responsive to the at least one condition signal to cause the at least one alarm output device to output an alarm signal; and
   at least one relay mounted within the housing, wherein the at least one relay is operative to open and close at least one AC circuit which is operative to power run windings and start windings of at least one motor of at least one pump, wherein the at least one pump is operative to change a depth level of the fluid level in the reservoir, wherein the at least one processor is operative to monitor levels of current associated with the run windings, wherein responsive to a monitored level of current associated with the run windings corresponding to a predetermined level, the at least one processor is operative to cause the at least one AC circuit to remove power from the start windings while the AC circuit continues to power the run windings.

2. The apparatus according to claim 1, wherein the at least one processor is operative to cause the at least one relay to at least one of open and close the at least one AC circuit responsive to the at least one condition signal and responsive to at least one of current and voltage of the at least one AC circuit being within a predetermined amount of time of a cross-over point.

3. The apparatus according to claim 1, wherein the housing complies with at least the National Electrical Manufacturers Association (NEMA) 4X standard for fluid penetrations.

4. The apparatus according to claim 1, further comprising at least one input device in operative connection with the at least one processor, wherein the at least one input device is operative to specify at least one alarm level, wherein the at least one processor is operative to cause the at least one alarm to output the alarm signal responsive to the at least one alarm level and the at least one condition signal.

5. The apparatus according to claim 4, wherein the housing includes an opening and a door that is operative to close the opening, wherein the housing further includes a sub-door in hinged connection with an inside portion of the housing, wherein at least a portion of the at least one processor is mounted to the sub-door.

6. The apparatus according to claim 1, further comprising:
   the reservoir;
   the at least one pump including the at least one motor; and
   at least one fluid level sensing device positioned within the reservoir and in operative connection with the at least one processor, wherein the at least one condition signal is produced responsive to the at least one fluid level sensor device and is representative of the depth level of the fluid in the reservoir.

7. The apparatus according to claim 6, wherein the at least one fluid level sensing device comprises a pressure bell positioned in the reservoir.

8. The apparatus according to claim 6, wherein the at least one fluid level sensing device comprises at least one float device positioned in the reservoir.

9. The apparatus according to claim 1, wherein the at least one processor is operative to determine an amount of time that has elapsed after AC power is applied to the start windings, wherein the at least one processor is further operative to remove power from the start windings when the determined amount of time that has elapsed exceeds a predetermined amount of time.

10. A method comprising:
   a) monitoring at least one condition signal with at least one processor of a control panel apparatus, which at least one condition signal corresponds to a depth level of a fluid in a reservoir, wherein the apparatus includes at least one relay operative to open and close at least one AC circuit operative to power run windings and start windings of at least one motor of at least one pump;
   b) determining with the at least one processor that the at least one condition signal corresponds to at least one predetermined condition associated with the fluid in the reservoir;
   c) responsive to (b) controlling operation of the at least one pump to change the depth level of the fluid level in the reservoir, including:
      i) causing with the at least one processor, the at least one relay to close the at least one AC circuit;
      ii) determining with the at least one processor that a level of current associated with the run windings corresponds to a predetermined level; and
      iii) responsive to (ii) causing with the at least one processor, the at least one AC circuit to remove power from the start windings while the AC circuit continues to power the run windings.

11. The method according to claim 10, wherein (c) includes
   iv) determining with the at least one processor that at least one of current and voltage associated with the at least one AC circuit is within a predetermined amount of time of a cross-over point;
   v) causing with the at least one processor the at least one relay to open the at least one AC circuit responsive to (iv) and remove power to the run windings.

12. The method according to claim 11, wherein (c) further includes:
   vi) prior to i), determining with the at least one processor that at least one of current and voltage associated with the at least one AC circuit is within the predetermined amount of time of a cross-over point;
   wherein (i) is carried out responsive to (vi).

13. The method according to claim 10, wherein in (ii) the predetermined level of current corresponds to the at least one motor of the at least one pump operating at least at 75% of full speed.

14. The method according to claim 10, further comprising:
   d) responsive to (b) causing with the at least one processor, at least one alarm output device in operative connection with the apparatus to output an alarm signal.

* * * * *